(12) United States Patent
Kulkarni et al.

(10) Patent No.: US 7,631,011 B2
(45) Date of Patent: Dec. 8, 2009

(54) CODE GENERATION PATTERNS

(75) Inventors: Dinesh Chandrakant Kulkarni, Sammamish, WA (US); Anders Hejlsberg, Seattle, WA (US); Matthew J. Warren, Redmond, WA (US); Luca Bolognese, Redmond, WA (US); Henricus Johannes Maria Meijer, Mercer Island, WA (US); Peter A. Hallam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 11/193,690

(22) Filed: Jul. 29, 2005

(65) Prior Publication Data

US 2007/0027907 A1 Feb. 1, 2007

(51) Int. Cl.
*G06F 17/30* (2006.01)
(52) U.S. Cl. .................. 707/103 R; 707/1; 707/102
(58) Field of Classification Search .................. None
See application file for complete search history.

(56) References Cited

U.S. PATENT DOCUMENTS

| | | | |
|---|---|---|---|
| 5,500,881 A | 3/1996 | Levin et al. | |
| 5,504,885 A | 4/1996 | Alashqur | |
| 5,615,362 A | 3/1997 | Jensen et al. | |
| 5,664,180 A * | 9/1997 | Halpert et al. | 707/102 |
| 5,748,966 A | 5/1998 | Sato | |
| 5,761,493 A | 6/1998 | Blakeley et al. | |
| 5,897,622 A | 4/1999 | Blinn et al. | |
| 5,907,846 A | 5/1999 | Berner et al. | |
| 5,937,402 A | 8/1999 | Pandit | |
| 5,937,409 A | 8/1999 | Wetherbee | |
| 6,016,497 A | 1/2000 | Suver | |
| 6,101,502 A | 8/2000 | Heubner et al. | |
| 6,243,709 B1 | 6/2001 | Tung | |
| 6,339,775 B1 | 1/2002 | Zamanian et al. | |
| 6,470,354 B1 | 10/2002 | Aldridge et al. | |
| 6,567,819 B1 | 5/2003 | Cheng et al. | |
| 6,615,323 B1 | 9/2003 | Petersen et al. | |
| 6,690,981 B1 | 2/2004 | Kawachi et al. | |
| 6,857,118 B2 | 2/2005 | Karr et al. | |
| 6,985,912 B2 | 1/2006 | Mullins et al. | |
| 6,993,529 B1 | 1/2006 | Basko et al. | |
| 7,043,720 B2 | 5/2006 | Kuzmin | |
| 7,096,231 B2 | 8/2006 | Rajak et al. | |
| 7,103,590 B1 | 9/2006 | Murthy et al. | |
| 7,137,100 B2 | 11/2006 | Iborra et al. | |
| 7,185,016 B1 | 2/2007 | Rasmussen | |
| 7,197,747 B2 | 3/2007 | Ishizaki et al. | |
| 7,284,242 B2 | 10/2007 | Vion-Dury | |

(Continued)

OTHER PUBLICATIONS

Abelson, et al., Structure and Interpretbn of Computer programs. The Rules of Evaluation [online], Cambridge, MA: The MIT Press. 1996 [retrieved on Jan. 30, 2007]. Retrieved from the Internet: CURL:http:llmitpress.mit.edu/sicp/full-text/sicp/book/node56.html>,(chapter 3.2.1).

(Continued)

*Primary Examiner*—Charles Rones
*Assistant Examiner*—Belix M Ortiz
(74) *Attorney, Agent, or Firm*—Workman Nydegger

(57) ABSTRACT

The subject disclosure pertains to code generation patterns for use in object relational mapping. The code patterns may be used to manage bidirectional relationships and ensure consistency. The code patterns may support on-demand or deferred loading of relational data. Change detection and tracking are also provided. In addition, a default member modifier allows developers to override tool generated source code without directly modifying the generated source code.

4 Claims, 13 Drawing Sheets

U.S. PATENT DOCUMENTS

| | | | |
|---|---|---|---|
| 7,289,997 | B1 | 10/2007 | Kita et al. |
| 7,310,638 | B1 | 12/2007 | Blair |
| 2002/0194155 | A1 | 12/2002 | Aldridge et al. |
| 2003/0208505 | A1 | 11/2003 | Mullins et al. |
| 2004/0098384 | A1 | 5/2004 | Min et al. |
| 2004/0148592 | A1 | 7/2004 | Vion-Dury |
| 2004/0158549 | A1 | 8/2004 | Matena et al. |
| 2004/0194057 | A1 | 9/2004 | Schulte et al. |
| 2004/0210828 | A1 | 10/2004 | Langer |
| 2004/0230584 | A1 | 11/2004 | Nouri |
| 2004/0243921 | A1 | 12/2004 | Carr et al. |
| 2004/0260691 | A1 | 12/2004 | Desai et al. |
| 2004/0268328 | A1 | 12/2004 | Plesko et al. |
| 2005/0027681 | A1 | 2/2005 | Bernstein et al. |
| 2005/0055336 | A1 | 3/2005 | Hui et al. |
| 2005/0138073 | A1 | 6/2005 | Zhou et al. |
| 2006/0179068 | A1 | 8/2006 | Warner et al. |
| 2006/0195476 | A1 | 8/2006 | Nori et al. |
| 2006/0200438 | A1* | 9/2006 | Schloming |
| 2006/0294059 | A1 | 12/2006 | Chamberlain et al. |
| 2007/0027907 | A1 | 2/2007 | Kulkarni et al. |
| 2007/0067716 | A1 | 3/2007 | Jung et al. |

OTHER PUBLICATIONS

Barendrfgt, The Impact of the Lambda Calculus and Computer Science, The Bulletin of Symbolic Logic [online], Jun. 1997 [retrieved on Jan. 30, 2007] Retrieved from the Inlemet:<UPL;https://www.mcs.vuw.ac.nz/courses/COMP432/2006T2/docs/BarLambda.pdf>.
International Search Report dated Mar. 1, 2007 for PCT Application Serial No. PCT/US 06/24567, 2 Pages.
Vieira et al. "XVerter: Querying XML Data with OR-DBMS," AMD 2003, Nov. 7, 2003, 8 pages, New Orleans, Louisiana.
Bonifati et al. "Pushing Reactive Services to XML Repositories Using Active Rules," ACM 2001, May 1, 2001, 9 pages, Hong Kong.
Sundaresan et al. "Algorithms and Programming Models for Efficient Representation of XML for Internet Applications," ACM 2001, May 1, 2001, 10 pages, Hong Kong.
International Search Report dated Sep. 17, 2007 for PCT Application Serial No. PCT/US 06/24567, 3 Pages.
C#: Overview of C# 3.0, Draft 2, Jul. 2005, 18 pages.
U.S. Appl. No. 11/193,574, filed Jul. 29, 2005, Meijer et al.
U.S. Appl. No. 11/193,573, filed Jul. 29, 2005, Warren et al.
U.S. Appl. No. 11/193,787, filed Jul. 29, 2005, Meijer et al.
U.S. Appl. No. 11/019,335, filed Dec. 21, 2004, Sonkin et al.
Brigit Demuth, et al. OCL as a Specification Language for Business Rules in Database Applications. Springer Verlag Berlin, Heidelberg 2001.
J. A. Orenstein, et al. Assessing a Relational Database through an Object Oriented Interface (extended abstract) VLDB Conference 1995.
Thad Scheer, et al. Acceleration Your Object—Oriented Development. An Obectivity, Inc.White Paper. Lockheed-Martin Mission Systems 1999.
Timothy L. Eshelman. Standard Interface : An Object to Relational Mapping Interface to Relational Databases. TCL 2003/2004. At&T Corp.
International Search Report dated Nov. 14, 2007 for PCT Application Serial No. PCT/US06/25575, 2 Pages.
TH Heil, JE Smith. "Concurrent garbage collection using hardware-assisted profiling," Proceeding of the 2nd international symposium on Memory . . . , 200—prtal.acm.org.
Gupta, et al. Semantic-Based Filtering: Logic Programming Killer App. Retrieved Jul. 30, 2007.
Jones, et al. A Pattern Language Implementation, 2004. Retrieved Jul. 30, 2007.
OA Dated Oct. 31, 2008 for U.S. Appl. No. 11/193,573, 22 pages.
Urban, et al. An Object Oriented Query Object Interface to Relational Databases, IEEE, 1994.
Schrettner, et al. Parallel Execution of Object Functional Queries. Proceedings of the Fourth Symposium on Programming Languages and Software Tools, Hungary, Jun. 9-10, 1995.
Burton. .Net Common Language Runtime Unleashed, Chapter 14: Delegates and Events, Apr. 4, 2002, 3 pages. SAMS.
Functional Programming. J. Webster (ed). Wiley Encyclopedia of Electrical and Electronics Engineering, 1999. John Wiley and Sons, Inc., 13 pages.
OA Dated Dec. 12, 2008 for U.S. Appl. No. 11/193,565, 90 pages.
OA Dated Dec. 29, 2008 for U.S. Appl. No. 11/193,566, 24 pages.
OA Dated Dec. 18, 2008 for U.S. Appl. No. 11/193,574, 26 pages.

* cited by examiner

CODE GENERATION PATTERNS

CROSS-REFERENCE TO RELATED APPLICATIONS

This application is related to co-pending U.S. application Ser. No. 11/193,574, entitled, "RETRIEVING AND PERSISTING OBJECTS FROM/TO RELATIONAL DATABASES", filed on Jul. 29, 2005, and co-pending U.S. patent application Ser. No. 11/193,573, entitled, "INTELLIGENT SQL GENERATION FOR PERSISTENT OBJECT RETRIEVAL", filed on Jul. 29, 2005. The entireties of the aforementioned applications are incorporated herein by reference.

BACKGROUND

Due to continuous increases in memory and processing power, code generation has become popular method of increasing programmer productivity. In recent years, the popularity of code generators has increased. Code generators automatically generate source-level language code (e.g., C, C#, Visual Basic, Java . . . ). Use of automatically generated code may reduce development time and increase stability of code.

In particular, code generation has become popular in the context of object-relational mapping (ORM). Relational data storage systems (e.g., DB2, SQL Server, MySQL, . . . ) are utilized to store relational data and manage these of relationships. It is useful for software developed in source-level languages to access and manipulate the relational data stored in the relational data storage system. When the application software is managing the relational data, it should maintain the relationships inherent in the data. In addition, any changes or modifications to the relational data should be persisted back to the relational data storage system.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns machine-generated source. More specifically, the subject matter concerns machine generated source code related to the mapping of relational data to an object model while managing the data relationships. Code generation patterns are described which provide bidirectional relationships between data objects.

The generated object model may support on-demand or deferred loading of relational data from a data storage system. The object model may utilize a generic type to create a set of data tables corresponding the data storage system data tables. This allows the data storage system to be represented as a class containing data tables for each data storage system data table mapped to the object model.

The object model may also be capable of detecting and tracking changes to data pulled from the data storage system. The system provides an efficient method of identifying update data and preventing overwriting of modified data storage system data.

In addition, a default member modifier is provided. The default modifier provides developers the ability to override tool-generated source code with out directly modifying the source code.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. In addition, while the examples provided utilize the C# programming language, numerous alternative programming languages may be used.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

I. Default Member Modifier

Figure 1:
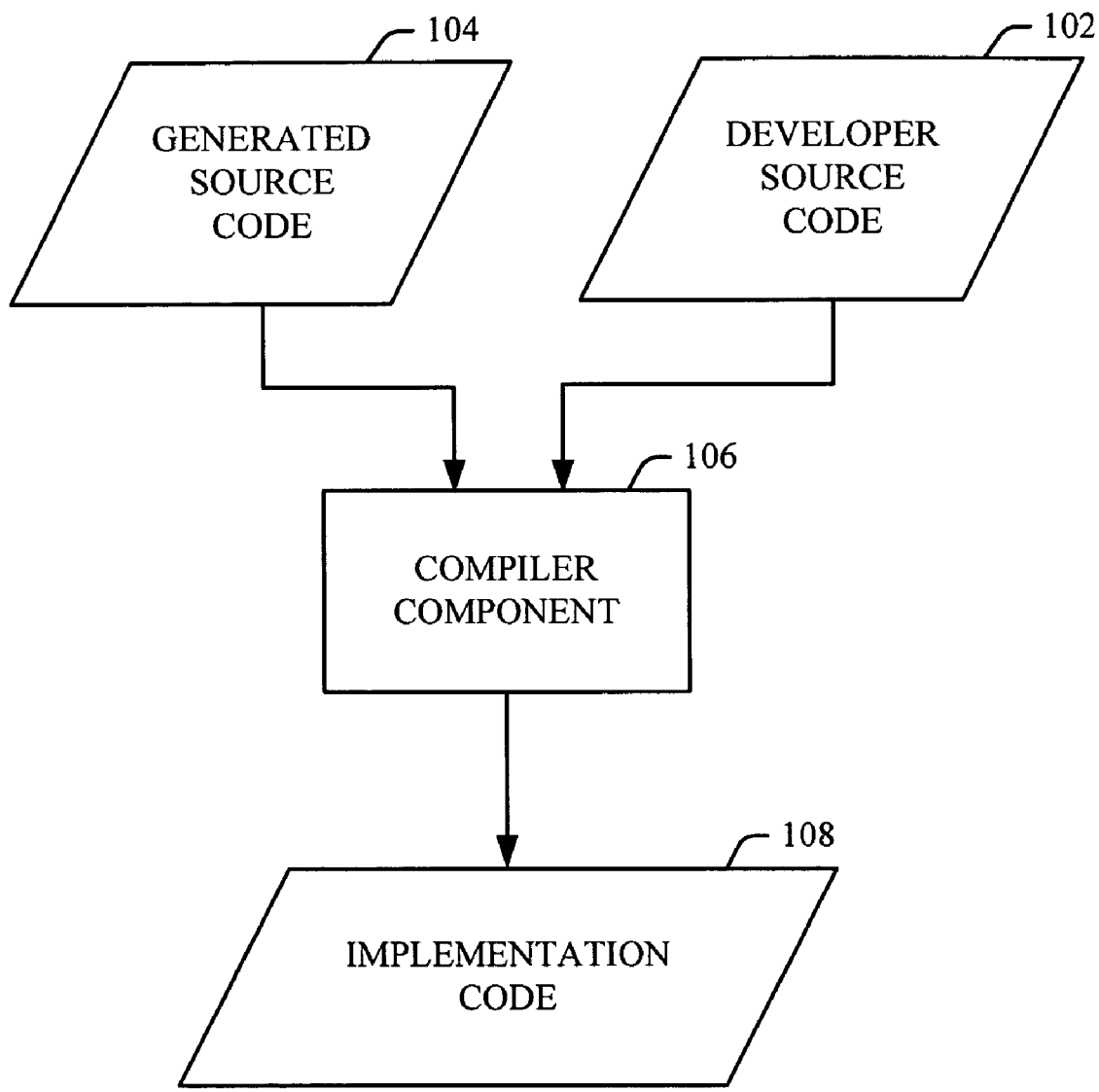
FIG. 1 is a block diagram of a compilation system for tool generated source code.

Referring now to FIG. 1, in general, programmers use code generating tools or source code generators to produce an initial structure for a program and then modify the generated source code. However, if it is necessary to generate the code again during software development, the developer's changes to the generated code will be overwritten. Consequently, developers may create separate source code files. Certain source level languages facilitate modification of generated code using separate source files. For example, C# provides partial types that allow classes and interfaces to be separated into multiple pieces and separate source files. A tool generated partial class can be merged with a developer written partial class during compilation, so that each partial class can be independently created and maintained. FIG. 1 illustrates a compilation system. During compilation the developer source code 102 and the generated source code 104 are combined by the compiler component 106. The resulting implementation code 108 (e.g., executable, intermediate language . . . ) is the same as if the developer source code 102 and the generated source code 104 had been written in a single unit.

Partial classes provide software developers with the ability to add members to partial classes declared in tool generated source code, but do not allow developers to modify members declared in the generated source code. A member of a partial class may be declared either in generated code or in developer code, but not in both. If a member is declared more than once for a partial class, the compiler will generate a conflict.

The code generator may provide a default class member modifier. The default member modifier indicates that the member declaration is to be used in the absence of a nondefault member declaration. Consequently, the default member may be overwritten by a nondefault class member. This provides software developers with a mechanism to modify tool-generated members of partial classes without generating a conflict during compilation.

Figure 2:
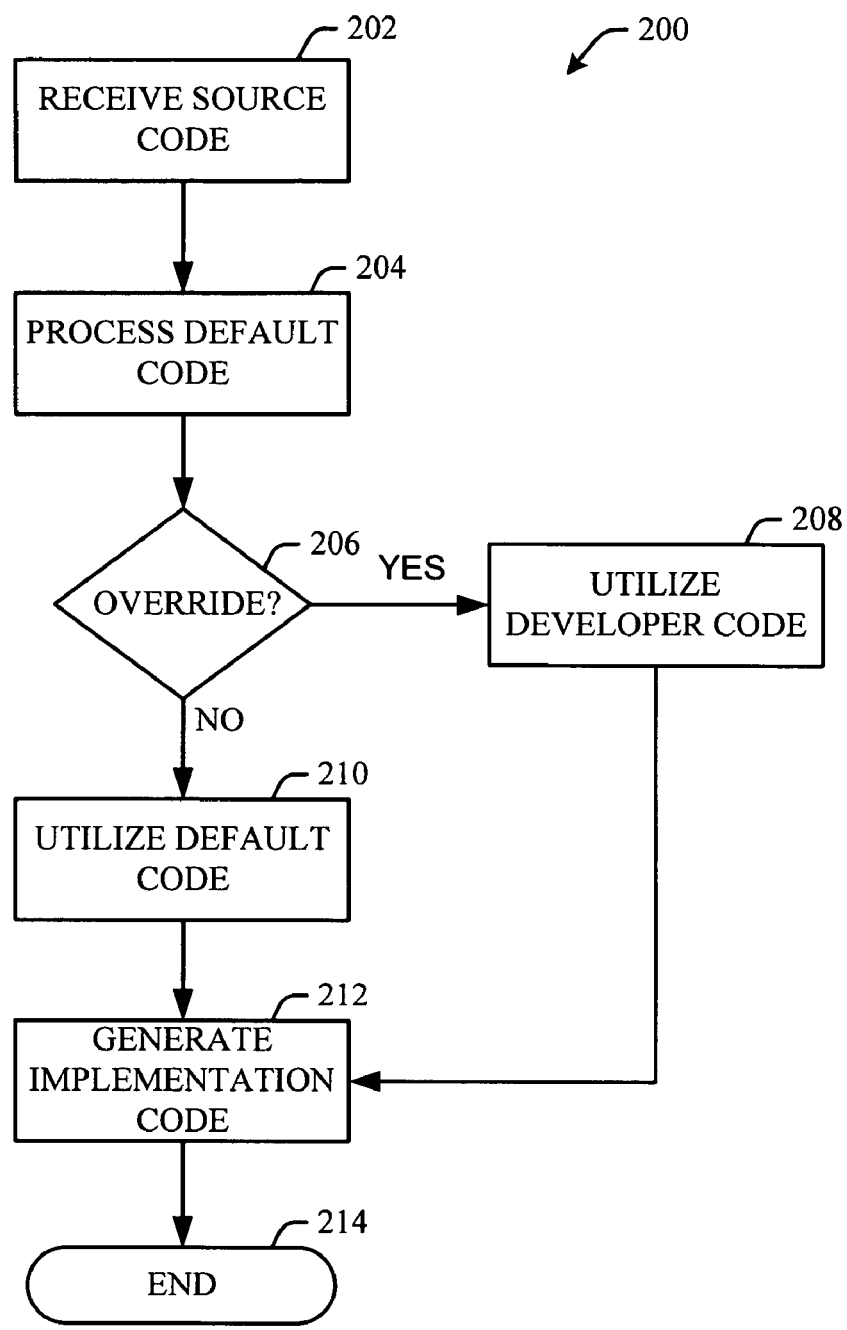
FIG. 2 is a flowchart of a method for processing default class members.

FIG. 2 is a flowchart illustrating a method 200 for processing of default members. Beginning at reference number 202, a compiler receives source code. The source code may be produced by a code generation tool, a software developer or both. At 204, a default member modifier is detected. When the compiler finds a default member in a partial class, the compiler component determines whether there is an identically named member of the class that overrides the default member at 206. The overriding member may be in a separate developer created source file. If there is a nondefault or overriding member, at 208 the compiler will utilize the source code of the overriding member and disregard the default source code. At 212, the implementation code is generated using the overriding source code. However, in the absence of any overriding code, at 210 the default source code is utilized and the implementation code incorporates the default source code at 212. The compilation process terminates at 214.

Consider the following C# class declaration in generated source code file Customer1.cs:

```
partial class Customer
{
    public default string Name {
        get {
            return name;
        }
        set {
            name = value;
        }
    }
    public default string Status {
        get {
            return status;
        }
        set {
            status = value;
        }
    }
    public default decimal ComputeDiscount( )
    {
        return (Status == "Gold" ? 0.1M : 0.05M);
    }
    ...
}
```

The partial class Customer is declared and includes three default members: Name, Status and ComputeDiscount. A software developer who wishes to modify the members of Customer may declare the partial class Customer in a separate source file, for example Customer2.cs:

```
partial class Customer {
    public string Status {
        get
        {
            return status;
        }
        set
        {
            status = value;
            if (status == "Gold") PremierList.Add(this);
        }
    }
    public decimal ComputeDiscount( )
    {
        // Custom computation different from the code above
    }
    ...
}
```

Here, the developer has not defined a Name member. Therefore, the default Name member defined in the generated code will be utilized by the compiler. The developer has defined a property member Status and a method member ComputeDiscount. The two members are identical in name to the members of partial class Customer declared in the generated source code, but include different or additional logic. Because of the member modifier default, the members declared in the software developer's source code would take precedence over the generated code property and method. The default member modifier allows developers to override class members in the generated code without directly modifying the generated source code files.

The default member modifier may also be utilized with blueprints. As used herein, a blueprint is a declarative language document (e.g., extended markup language (XML)) that may be translated into source code. All partial class members generated using blueprints may automatically be specified with the default modifier unless the default modifier is explicitly turned off. Consider the following exemplary blueprint:

```
<class name="Northwind.Customer" table="Customers">
    <property name="Name" column="ContactName"
defaultModifier="False"/>
    ...
</class>
```

The default modifier may be turned off explicitly, if desired, by specifying an attribute, such as the defaultModifier for the Customer Name property. Alternatively, partial class members generated using blueprints may automatically be specified not to use default, unless the default modifier is explicitly turned on.

II. Code Generation Patterns For Relationship Management

Figure 3:
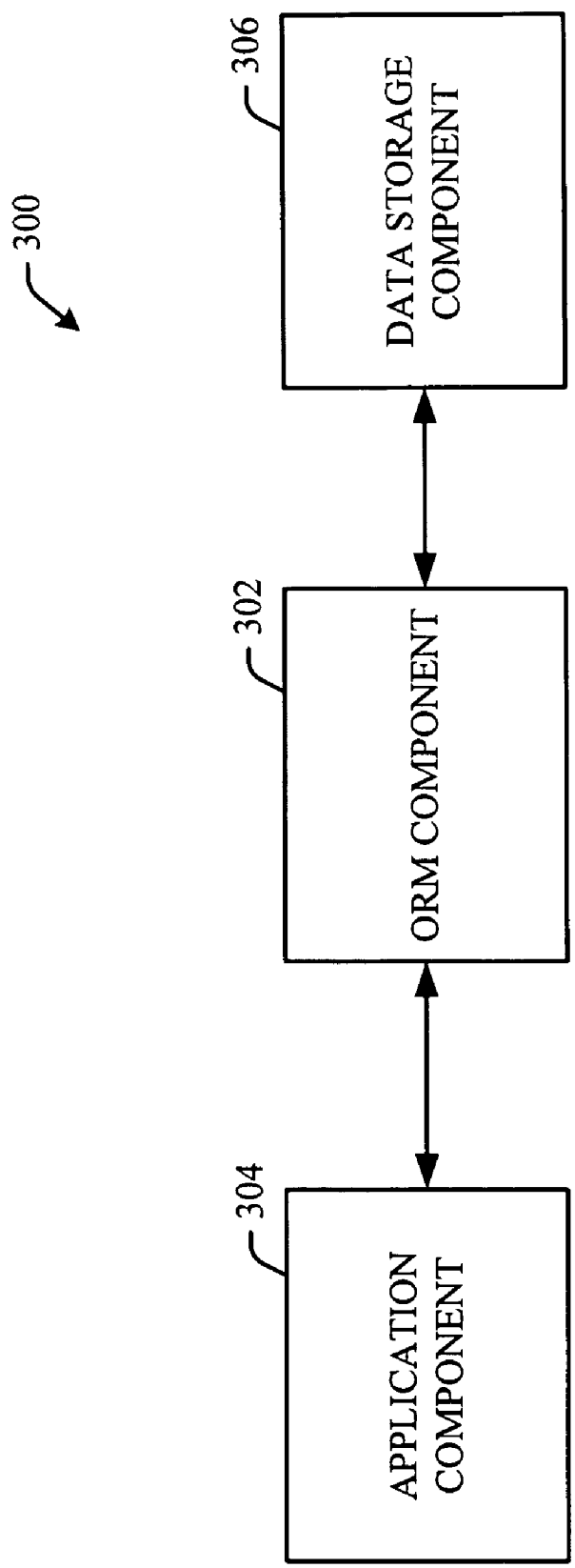
FIG. 3 is a block diagram of an ORM system.

Referring now to FIG. 3, tool generated code is frequently used in ORM systems. As shown in FIG. 3, an ORM system 300 may include an ORM component 302 that acts as an interface between an application component 304 and a data storage component 306. Relational data may be retrieved from the data storage component 306 and managed by the ORM component 302 for use by the application component 304.

Conventional ORM systems fail to adequately provide for relationship management. In general, there are three problematic relationship types: one-to-one, one-to-many and many-to-many. In a one-to-one relationship each entity of type A has a relationship with exactly one entity of type B and the entity of type B has a corresponding relationship with the entity of type A. For example, in a simple inventory system each customer A has a unique credit card number and each credit card number has exactly one customer associated with it. In a one-to-many relationship a single entity of type A has a relationship with one or more entities of type B, but each entity of type B is associated with a single entity of type A. For example, in the inventory system a customer may place one or more orders and each order will be associated with the single customer who placed the order. Finally, in a many-to-many relationship an entity of type A may have a relationship with more than one entity of type B, and each entity of type B may have a relationship with more than one entity of type A. For example, an order may be placed for a number of products and a single product may be included in multiple orders.

In general, object-oriented languages do not provide software developers with tools to manage relational data and ensure consistency of relationships. For example, when data for a one-to-many relationship such as the customer order relationship is mapped using object oriented source code, it is frequently mapped as illustrated in the following C# class declarations:

```
class Customer
{
    ...
    public List<Order> Orders;
}
class Order
{
    ...
    public Customer Customer;
}
```

Here, the source code includes by declaring an Order class with a Customer member and a Customer class and having a member, Orders, where Orders is a list of orders associated an instance of Customer. While the instances of the Customer and Order classes illustrated above may be populated with relational data, the classes fail to require consistency in the relationships between the objects. There is no mechanism to prevent a developer's code from modifying orders for a Customer instance without updating the Customer member for the corresponding order. When objects are populated with relational data, it is the responsibility of the programmer to ensure that the objects are consistent with the relational data. Similarly, when an object such as an order is removed, the programmer is responsible for ensuring that all the relevant relationships are updated. If an Order is deleted, the Order must be removed from the list of orders for the related Customer.

An ORM system may use the code generation patterns described below to model one-to-one, one-to-many and many-to-many relationships while enforcing relationship consistency. The code generation patterns may include a container component, also referred to as a container that provides for the enforcement of the bidirectional relationships required to adequately model relational data. Each data object component, also referred to as a data object, (e.g., Customer) may include a container that includes information corresponding to other data objects in the relationship (e.g., Order). The data objects and containers may be used in pairs to model the one-to-one, one-to-many and many-to-many relationships. Each container may include one or more notifications that allow the container to notify corresponding data object if the relationship between the data objects is modified.

Containers may be implemented as generic classes that can be instantiated for different types of objects. A container may include an aggregate of a set of data objects (e.g., a set of orders). Containers that include a set of data objects are referred to as set containers. Alternatively, the container may include a reference to a data object (e.g., customer name for an order), rather than a set of data objects. Such containers are referred to herein as reference containers. A pair of reference containers may be used to model a one-to-one relationship. A pair of set containers may be used to model a many-to-many relationship. The combination of a reference container and a set container may be used to model the one-to-many relationship.

Figure 4:
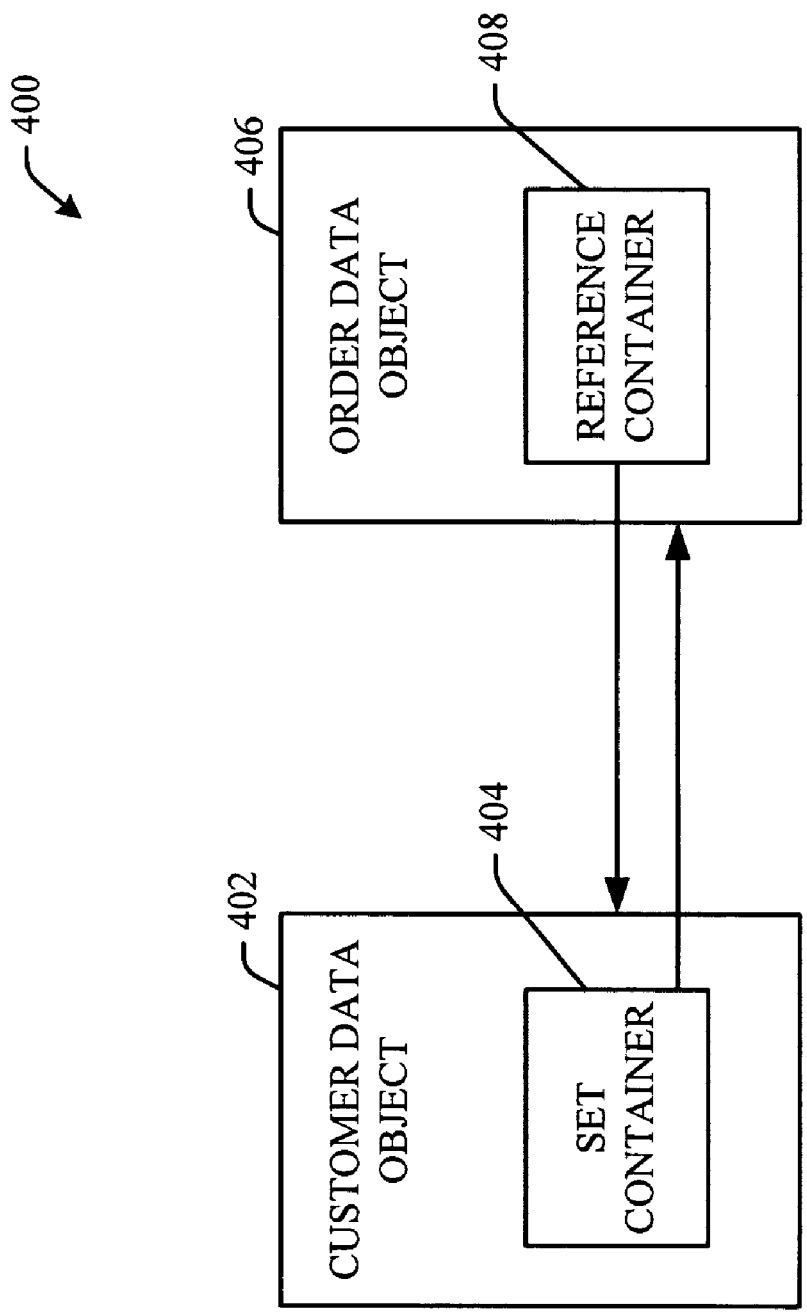
FIG. 4 is a block diagram illustrating the customer order relationship.

FIG. 4 is a block diagram of illustrating the customer order relationship. A customer data object 402 has a set container 404 that includes object information corresponding to the order data object 406. Similarly, the order data object 406 has a reference container 408 that includes object information corresponding to the customer data object 402. The set container may include a notification component (not shown), such that a change to the object information contained in set container 404 causes a notification to be sent to the order data object 406. Similarly, the reference container may include a notification component (not shown), such that a change to the object information contained in reference container 408 causes a notification to be sent to the customer data object 402. Consider the following C# code:

```
partial class Customer
{
    ...
    public EntitySet<Order> Orders;
}
partial class Order
{
    ...
    public EntityRef<Customer> Customer;
}
```

Here, the list of orders associated with a customer is implemented as a set container using the EntitySet class and the customer associated with an order is implemented as a reference container using the EntityRef class. The EntitySet class and EntityRef class are described in detail below.

Consider an exemplary implementation of EntitySet:

```
public delegate void Notification<T>(T arg);
public class EntitySet<TEntity> : IList, IList<TEntity>
    where TEntity : class {
    ItemList<TEntity> entities;
    Notification<TEntity> onAdd;
    Notification<TEntity> onRemove;
    public EntitySet( ) {
    }
    public EntitySet(Notification<TEntity> onAdd,
Notification<TEntity> onRemove) {
        this.onAdd = onAdd;
        this.onRemove = onRemove;
    }
    public void Add(TEntity entity) {
        if (entity == null) throw new ArgumentException( );
        entities.Add(entity);
        if (onAdd != null) onAdd(entity);
    }
    public bool Remove(TEntity entity) {
        if (entity == null) throw new ArgumentException( );
        if (entities.Contains(entity)) {
            entities.Remove(entity);
            if (onRemove != null) onRemove(entity);
        }
    }
}
```

Here, the generic class EntitySet has a type parameter TEntity, where TEntity is constrained to a class including a list member and two method members, onAdd and onRemove. The EntitySet constructor has two parameters, notification delegates onAdd and onRemove. The Add and Remove methods ensure that the delegates for notification, onAdd and onRemove are called when an entity is added or removed from the EntitySet collection. The Add method for EntitySet performs basic error checking to ensure the entity to be added is not null, adds the entity to the list of entities and then notifies the entity of the addition using the onAdd method. Similarly, to remove an entity from the EntitySet, the Remove method performs basic error checking to ensure the entity to be removed is not null, removes the entity from the list of entities and then notifies the entity of the removal using the onRemove method.

EntitySet may be used to implement a set container for a customer's collection of orders. EntityRef may be used to implement a reference container used to store the customer associated with each order. Containers implemented using EntitySet and EntityRef may be paired to manage the one-to-many customer order relationship. EntityRef will be discussed in further detail below. Consider now an exemplary implementation of the Customer class for the customer order relationship discussed above utilizing the relationship management of EntitySet:

```
public partial class Customer : IChangeNotifier {
    ...
    private EntitySet<Order> _Orders;
    public Customer( ) {
        /* the following code provides the delegates for
Order object to be used for Add( ) and Remove( ) operations */
        this._Orders = new EntitySet<Order>(new
System.Query.Notification<Order>(this.attach_Orders), new
System.Query.Notification<Order>(this.detach_Orders));
    }
    ...
    private void attach_Orders(Order entity) {
        this.OnChanging( );
        entity.Customer = this;
    }
    private void detach_Orders(Order entity) {
        this.OnChanging( );
        entity.Customer = null;
    }
}
```

Here, the container infrastructure implemented by EntitySet may be used to add an Order to a Customer data object's collection of Orders. Only the parts of the generated code relevant to addition and deletion of Orders are shown above while the rest of the code is elided.

Class Customer includes an EntitySet container having a collection of order data objects. The Customer class includes methods attach_Orders and detach_Orders, which update the Customer member of an associated Order entity. Delegates for these methods are passed as parameters to the EntitySet constructor. Therefore, the Add and Remove methods of the EntitySet class, defined above, will use these methods for onAdd and onRemove.

Figure 5:
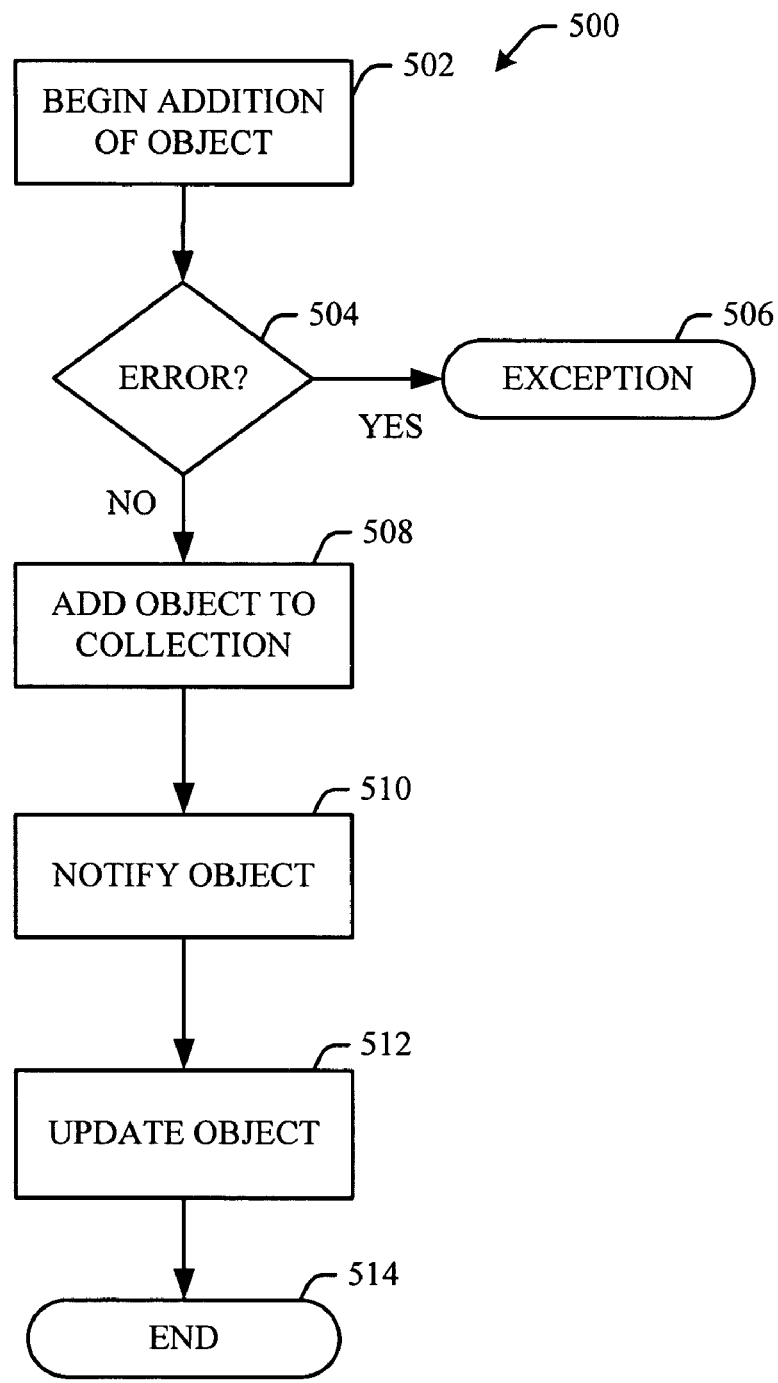
FIG. 5 is a flowchart of a method for adding a data object to a container while maintaining the data object relationships.

FIG. 5 is a flow chart diagram of a programming methodology 500 for adding a data object to a container for a one-to-many relationship while maintaining data object relationships. In particular, we will discuss addition of an order in the context of the customer order example discussed above. At reference numeral 502, the addition process is begun. A call may be made to add a data object to a collection of data objects. For example, an Order, Ord1, may be added to an instance of a customer, Cust1 by the call "Cust1.Orders.Add (Ord1)." At 504, basic error checking may be performed to determine whether the data object to be added is null. If there is an error, an exception may be generated at 506. Otherwise, at 508 the data object may be added to the collection of data objects. After the data object is added, there is a notification of the addition at 510 and the data object is updated to reflect the relationship at 512. Specifically, Ord1.Customer is set to Cust1. The process terminates at 514.

Figure 6:
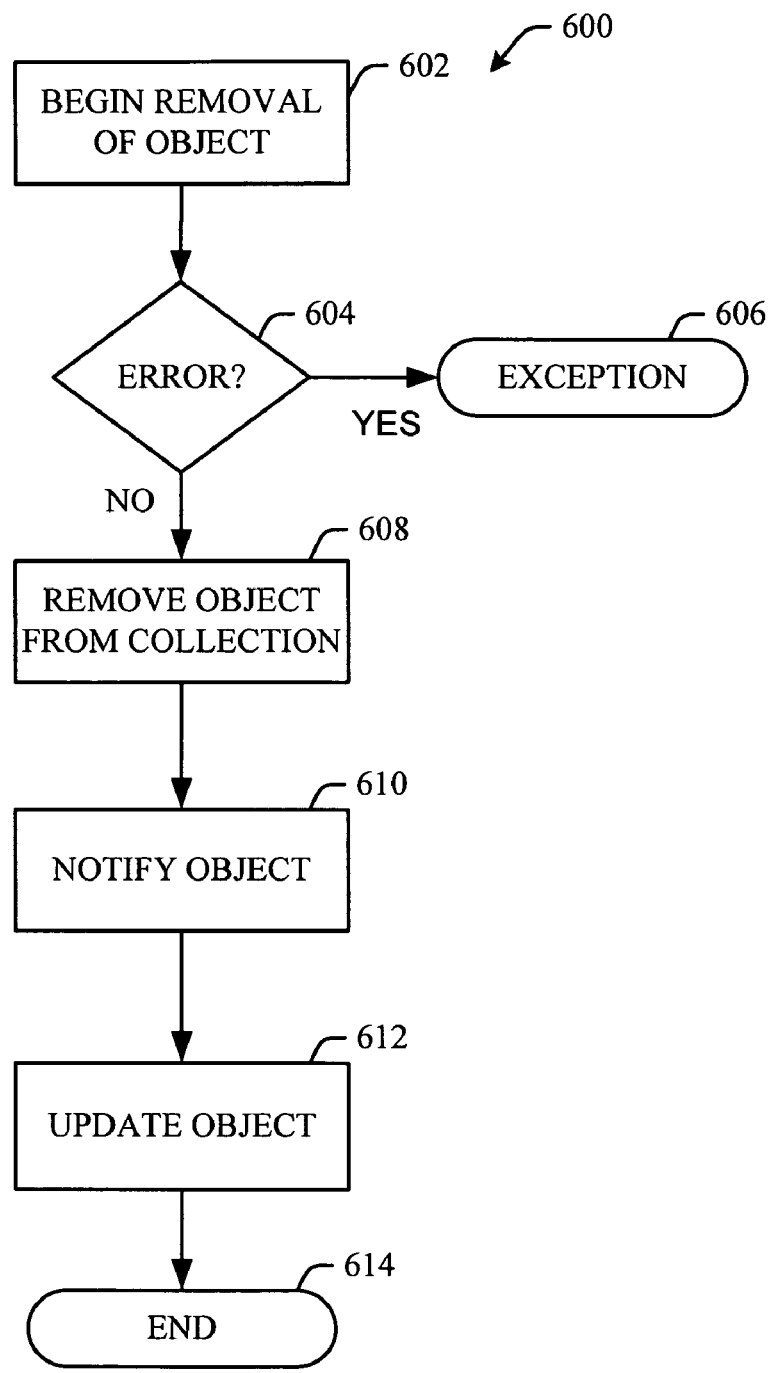
FIG. 6 is a flowchart of a method for removing a data object from a container while maintaining data object relationships.

FIG. 6 is a flow chart diagram of a programming methodology 600 for removing a data object from a set container for a one-to-many relationship while maintaining data object relationships. In particular, we will discuss removal of an order within the context of the customer order example discussed above. At reference numeral 602, the removal process is begun. A call may be made to remove a data object from a collection of data objects. For example, an Order, Ord2, may be removed from an instance of a customer, Cust1, by the call "Cust1.Orders.Remove(Ord2)." At 604, basic error checking may be performed to determine whether the data object to be removed is null. If there is an error, an exception may be generated at 606. Otherwise, at 608 the data object may be removed from the collection of data objects. After the data object is removed, there is a notification of the removal at 610 and the data object is updated to reflect the relationship at 612. Specifically, Ord2.Customer is set to null. The process terminates at 614.

A reference container may contain a reference to a data object rather than a collection of data objects. The reference container may be thought of as a more limited form of the set container and includes the same notifications present in the set container. The reference container may be used when mapping a one-to-one or a one-to-many relationship. For example, a reference container, implemented below as EntityRef, may be used with a set container implemented using EntitySet to model the customer order relationship discussed above. Consider the following exemplary implementation of EntityRef in C#:

```
public class EntityRef<TEntity> :
    where TEntity : class {
        TEntity entity;
        Notification<TEntity> onAdd;
        Notification<TEntity> onRemove;
        public EntityRef( ) {
        }
        public EntityRef(Notification<TEntity> onAdd,
Notification<TEntity> onRemove) {
            this.onAdd = onAdd;
            this.onRemove = onRemove;
        }
        public TEntity Entity {
            get {
                return entity;
            }
            set {
                if (onRemove != null) onRemove(entity);
                entity = value;
                if (onAdd != null) onAdd(entity);
            }
        }
    }
```

Here, the generic class EntityRef has a type parameter TEntity, where TEntity is constrained to a class including an entity member and two method members, onAdd and onRemove. The EntityRef constructor has two parameters, notification delegates onAdd and onRemove. The Add and Remove methods ensure that the delegates for notification, onAdd and onRemove are called when an entity is added or removed from the EntitySet collection. EntityRef includes the Entity property having a get accessor that returns the entity and a set accessor that sets the value of the entity. However, the set accessor performs a notification using the onAdd or onRemove method.

Figure 7:
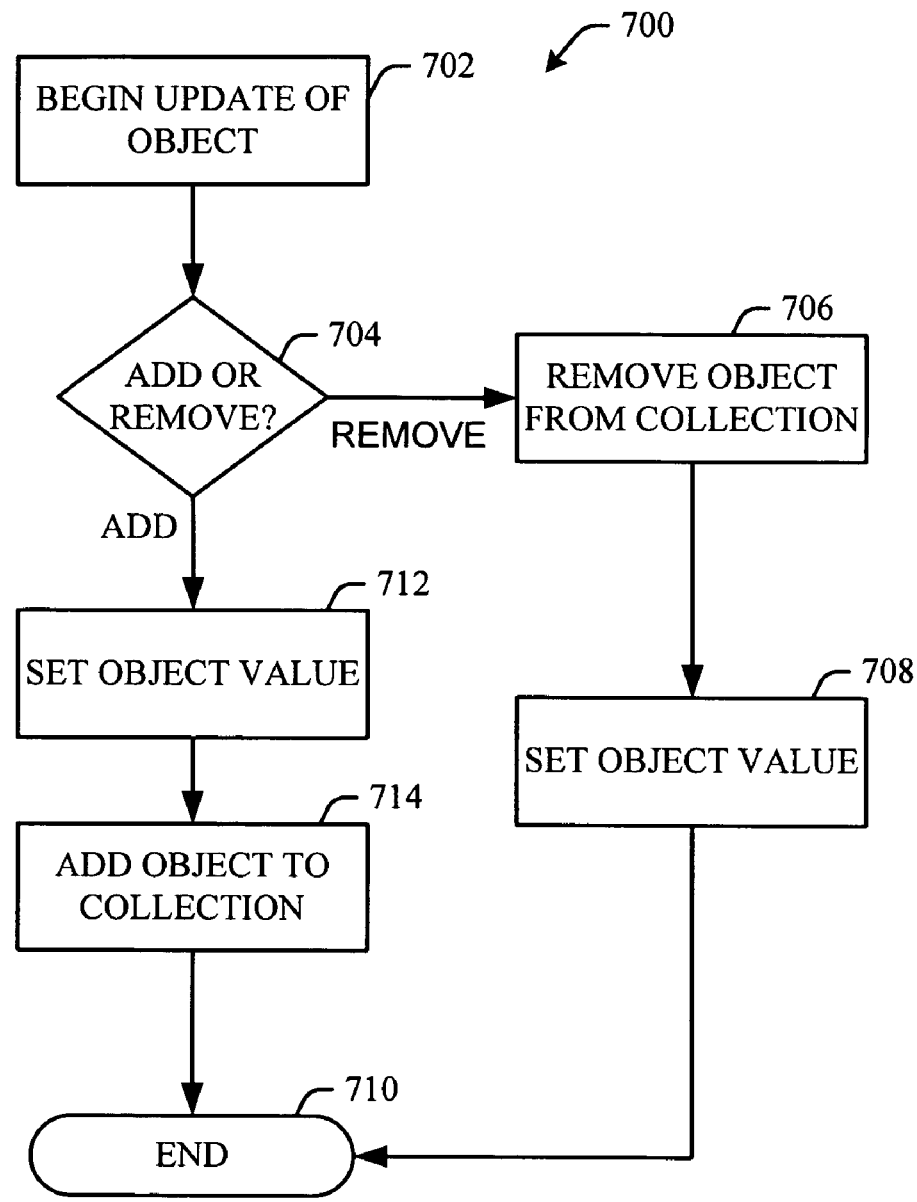
FIG. 7 is a flowchart of a method for adding or removing a data object reference while managing data object relationships.

FIG. 7 is a flow chart diagram of a programming methodology 700 for removing a data object from a set container while maintaining data object relationships. In particular, we will discuss addition or removal of an order with respect to our customer order example. At reference numeral 702, a call is made to update a data object. For example, an Order, Ord1, may be updated to add a customer, Cust1, by the call "Order =Cust1." At 704, a determination is made whether to add or remove the data object. If an order is to be removed, notification to remove the data object from the collection of data objects at 706 and the value is set to null at 708. The process then terminates at 710. However, if the order is to be added, the value is set at 712 and notification to add the data object to the collection of data objects at 714. The process terminates at 710.

Using set containers and reference containers, one can model one-to-one, one-to-many and many-to-many relationships. However, in order to prevent looping of notifications, a protocol must be established in which one member of the pair of containers retains control and manages the relationship. Looping would occur if the notification from the first container in the pair of containers triggered a notification from the second container back to the first container.

The source code for reference containers may be optimized. The reference container may be thought of as a limited set container. The functionality of the reference container may be achieved without declaring a separate class (e.g., EntityRef). As shown in the following C# code, the functionality of the reference container may be moved inside the declaration of partial class (e.g., Order) to reduce overhead.

```
public partial class Order {
    private EntityRef<Customer> _Customer;
    public Customer Customer {
        get {
            return this._Customer.Entity;
        }
        set {
            Customer v = this._Customer.Entity;
            if ((v != value)) {
                if ((v != null)) {
                    this._Customer.Entity = null;
                    v.Orders.Remove(this);
                }
                this._Customer.Entity = value;
                if ((value != null)) {
                    value.Orders.Add(this);
                }
            }
        }
    }
}
```

Here, the Customer property for the class Order includes a set accessor that adds or removes the order form the customer's list of orders. The set accessor is the functional equivalent of the onAdd and onRemove methods of the EntityRef class described above.

Optimizing the reference container may reduce overhead during processing, but may result in less concise source code. However, source code conciseness or clarity may not be critical for tool generated source code.

III. Deferred or Delayed Loading

The object relational mapping infrastructure may also provide for deferred or delayed loading of relational data. In general, relational data is retrieved from a data storage component either in a batch at the beginning of processing or on an as needed basis. For data intensive programming batch retrieval of data may require large amounts of memory to store the data during processing. Deferring the loading of data until the data is referenced reduces the amount of memory required. However, data objects should be loaded into memory prior to being referenced.

Figure 8:
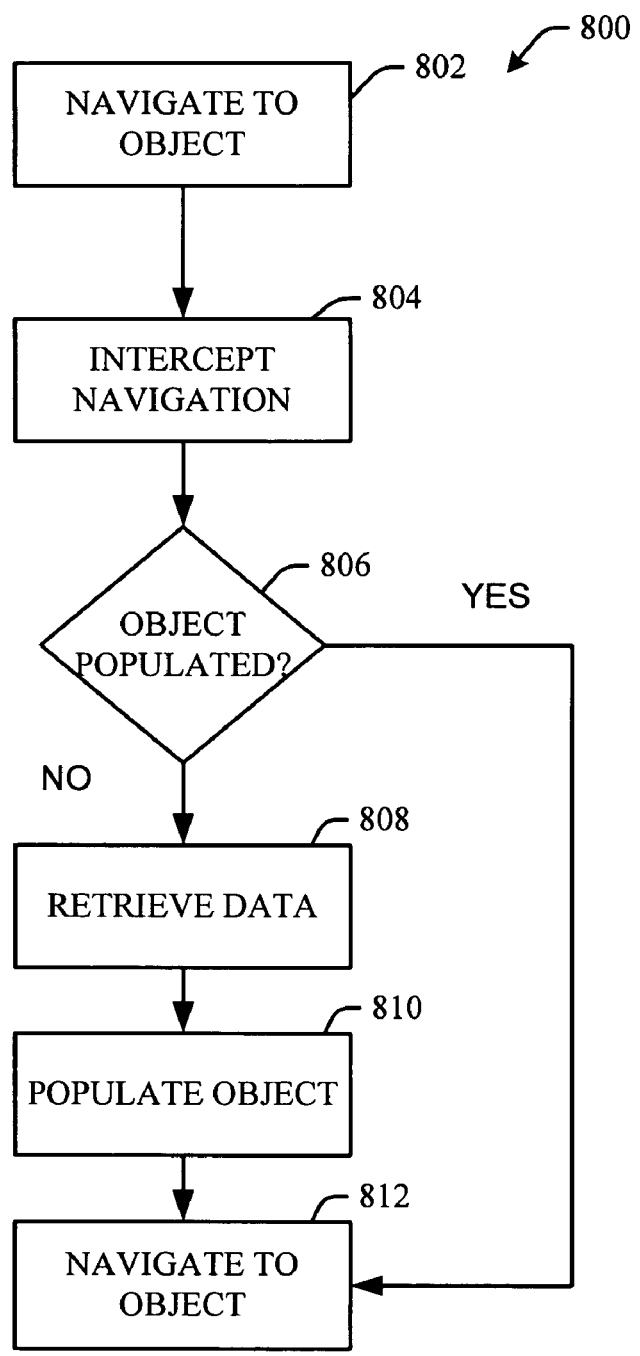
FIG. 8 is a flowchart illustrating a method for performing deferred loading for an ORM system.

FIG. 8 is a flowchart illustrating a method 800 for performing on demand of deferred loading in an ORM system. Beginning at reference numeral 802, during processing a call is made to navigate to a data object. Navigation to the data object is intercepted at 804. At 806, a determination is made as to whether the data object is already populated and contains the relational data or whether the data object has not yet been populated. If the data object contains the relational data, navigation to the data object continues at 812. Otherwise, the relational data corresponding to the data object is retrieved from a data storage component at 808. Retrieval may include a database query or any other method of data retrieval. At 810, the data object is populated using the retrieved data. Navigation to the data object continues at 812.

The reference and set containers may include a loading component to provide for deferred loading of relational data. The containers may intercept navigation between data objects, query the data storage component, and create and populate data objects on the fly, thereby creating the illusion that the data objects are fully populated without actually requiring loading every data object into memory prior to use.

The following exemplary C# code provides additional members to the EntitySet class to provide for delayed or deferred loading:

```
public class EntitySet<TEntity> : IList, IList<TEntity>
    where TEntity : class {
    IEntitySetLoader<TEntity> loader;
    ...
    public TEntity this[int index] {
        get {
            Load( );
            if (index < 0 || index >= entities.Count) throw new
                ArgumentException( );
            return entities[index];
        }
        set {
            Load( );
            if (index < 0 || index >= entities.Count) throw new
                ArgumentException( );
            if (value == null || IndexOf(value) >= 0) throw new
                ArgumentException( );
            entities[index] = value;
            OnRemove(old);
            OnAdd(value);
        }
    }
    public void Load( ) {
        if (loader != null) {
            entities = new List<TEntity>(loader.GetEntities( ));
            loader = null;
        }
    }
}
public interface IEntitySetLoader<TEntity>
{
    void TrackAdd(TEntity entity);
    void TrackRemove(TEntity entity);
    IEnumerable<TEntity> LoadEntities( );
}
```

Here, the get accessor intercepts navigation to a TEntity object and calls a Load method member of the EntitySet class. The Load method checks to see if the TEntity object is already loaded into memory and if not, the list of entities is created and populated. Intercepting navigation using the get accessor ensures that the target of an EntitySet is loaded prior to being referenced. Similarly, the set accessor intercepts navigation to a TEntity object. The set accessor also calls the load method to ensure that the TEntity object is created and populated prior to setting the value of the TEntity object.

IV. Strongly Typed Tables

Typically, data objects are stored in relational data tables for data storage systems or components such as databases. For example, in the inventory system discussed above, the data storage component may include a table of customers and a table of orders. When a new customer or order is added to the inventory system, a row is added to the appropriate table. Similarly, when a customer or order is deleted from the inventory system, a row is deleted from the appropriate table.

When modeling relational data from a data storage system using an object-oriented programming construct, the object model or construct should include a set of strongly typed data object tables corresponding to the relational data tables of the data storage system. The programming language construct data object tables may be a representation of the relational data tables of the data storage system for use in the application. In the inventory system example, the generated source code should include a table of Customers and a table of Orders.

Any changes to the construct tables by the application should be tracked and persisted to the data storage system tables. For example, each newly created instance of classes such as Customer should be tracked so that the corresponding data storage system table may be updated by inserting a new corresponding Customer row into the table. Similarly, deletions of Customers or other class instances should be tracked and persisted to the corresponding data storage system table for deletion of the rows.

Data object tables may be created using a generic class (e.g., Table). The generic class may be specialized to handle the different types of objects (e.g., customers, orders, suppliers, shippers . . . ) stored in the data object tables. Using a generic class to implement the data object tables leverages the common features of the tables. For example, each table may require a method to add and remove data objects. Consider the following exemplary declaration of Table:

```
public class Table<T> {
    public void Add(T item) {
        // Object relational mapping infrastructure tracks the item to be added
    }
    public void Remove(T item) {
        // Object relational mapping infrastructure tracks the item to be
        removed
    }
}
```

Defining members Add and Remove in the generic class Table eliminates the necessity of creating an Add and Remove member for each individual data object table.

Figure 9:
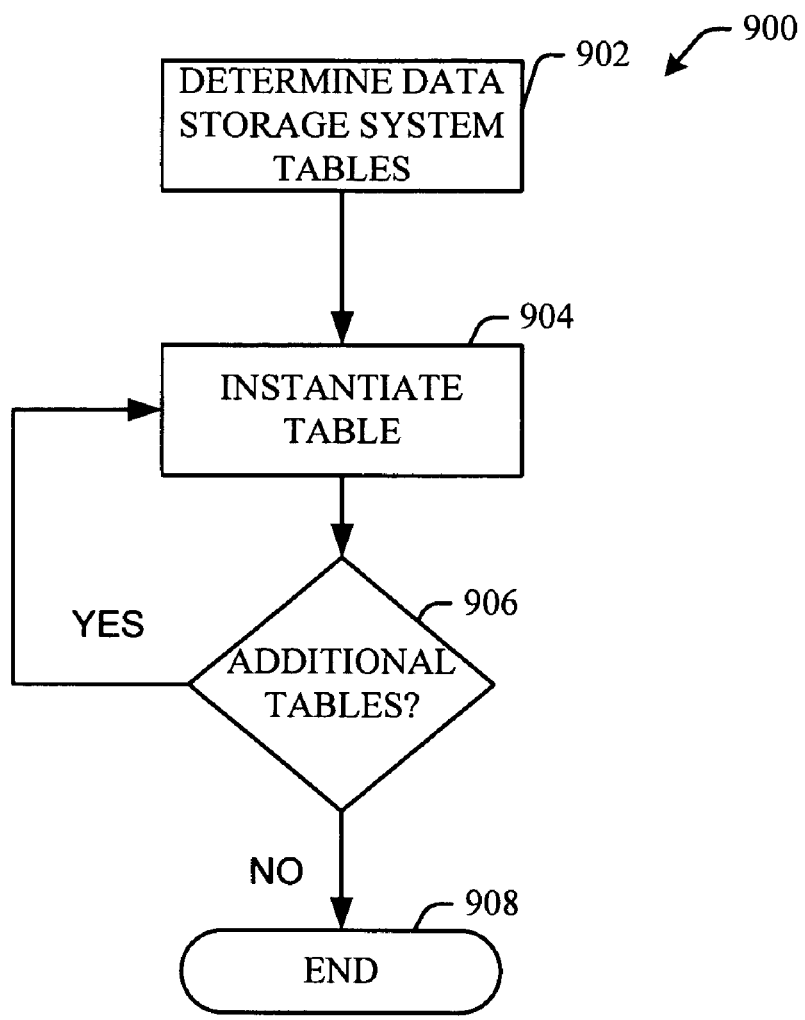
FIG. 9 is a flowchart illustrating a method for creating a set of data object tables corresponding to data storage system tables.

FIG. 9 illustrates a method 900 for creating a set of data object tables corresponding to data storage system tables. Beginning at reference number 902, the number of tables and type of each table in the data storage system are determined. At 904, a data object table corresponding to a data storage system table is instantiated using a generic class. At 906, a check is made to determine whether there are additional data storage system tables to model. If yes, the next data object table is instantiated at 904. If all of the data storage system tables have been modeled, the method terminates at 908.

For the example inventory system, a data context may be created using a set of data object tables to mirror the data storage system tables. Consider the following C# code:

```
public partial class Northwind : DataContext {
    public Table<Category> Categories;
    public Table<Customer> Customers;
    public Table<Shipper> Shippers;
    public Table<Supplier> Suppliers;
    public Table<Order> Orders;
    public Table<Product> Products;
}
```

Here, the generic class Table is used to create a collection of Customers, Shippers, Suppliers, Orders and Products. As used herein, Table<T> is a virtual representation of the corresponding data storage system table. The generated code provides for strong type checking for the Add and Remove methods for the individual data object tables. Generating the data object tables also spares the software developer from having to define a separate table class for each table of the data storage system, reducing work and debugging time for the developer.

Only the newly created instances and retrieved instances that are deleted are tracked using the strongly typed tables. An exemplary method for calling the generated code to ensure that new and deleted instances are appropriately tracked is shown:

```
Northwind myNorthwind;
...
Customer cc = new Customer {CustomerID = "ABCDE",
CompanyName="AcmeProducts"};
    myNorthwind.Customers.Add(cc);
    Customer cd = db.Customers.Element(|c| c.CustomerID == "ALFKI");
    myNorthwind.Customers.Remove(cd);
```

V. Relational Data Change Detection and Tracking

The code generation system may also provide for detection and tracking of changes to relational data pulled from data storage systems into object models. When relational data is pulled from a data storage system to populate data objects used by an application, the data objects may be modified without knowledge of the ORM system. However, any insertions, modifications or deletions should be persisted back to the data storage system. In addition, while a first application is processing, other applications may access the data storage system and modify the relational data that was used to populate the data objects used by the first application. When relational data is persisted to the data storage system from the first application, it should not overwrite changes made by other applications.

One simple solution is to maintain a copy of all data objects; the copies containing the original data retrieved from the data storage system. The copies may be compared with the current value of the data objects to determine if the data object has been modified. This results in memory being used to store identical copies for data objects that remain unchanged. In addition, when the modifications are persisted to the data storage system, each data object is compared to its copy containing the original values to determine if there has been any change to the data object. Processing time is wasted comparing data objects that have remained unchanged.

In one aspect of the disclosed subject matter, the code generator component may generate source level code, visible and modifiable by a developer, to implement change detection and tracking. The change detection and tracking may be implemented in source level code rather than hidden in an intermediate format (e.g., bytecode or IL (intermediate language)). Placing the implementation in source level code makes it transparent to software developers.

The generated code may create copies only for those data objects that are modified by the application. This would eliminate the need to create copies of each data object and minimize the space overhead by limiting the number of copies. In addition, this would eliminate the processing time required to compare unchanged data objects to their copies to determine if the data objects have changed.

Figure 10:
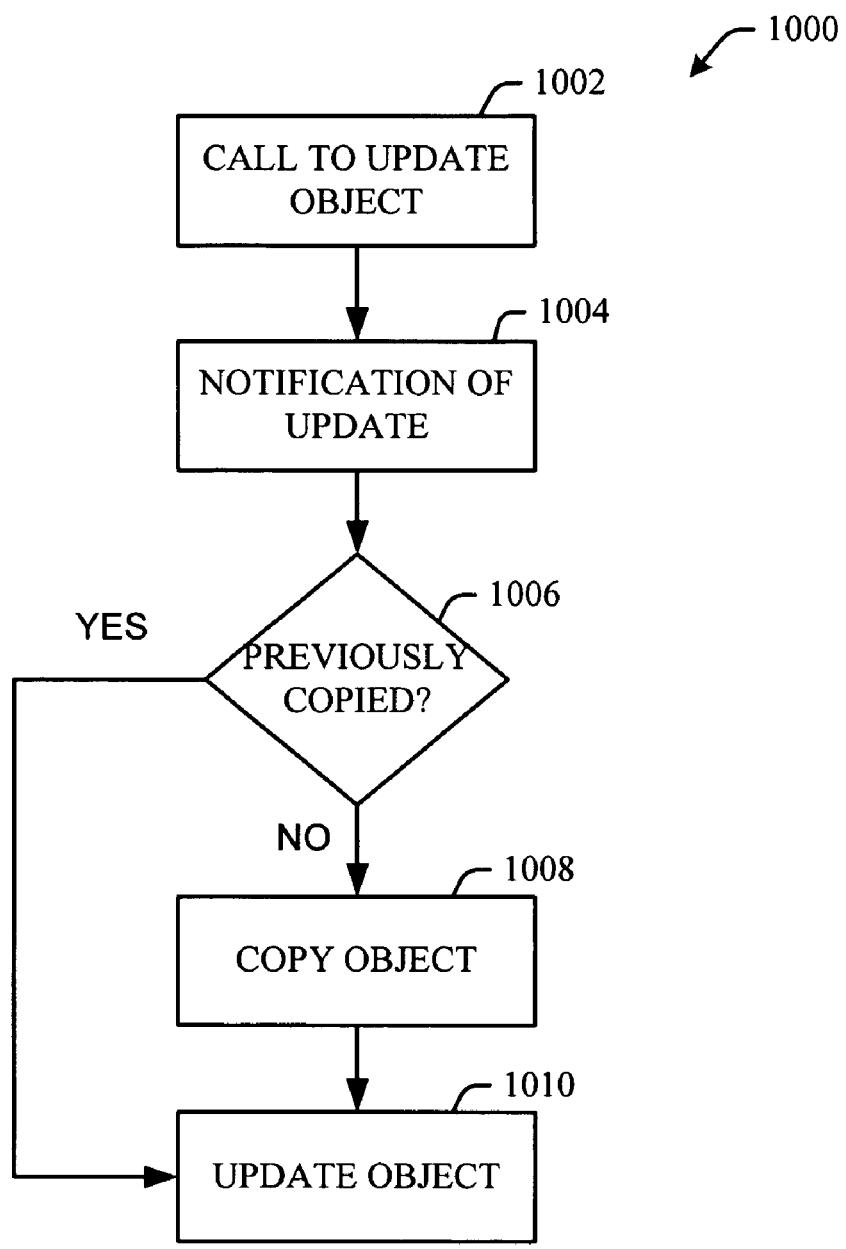
FIG. 10 is a flowchart illustrating a method for tracking modified objects.

Turning now to FIG. 10, the container source code may include a change notification component that notifies a change detection component in the ORM system when a data object is about to be modified. The change notification component may utilize an event handler. FIG. 10 illustrates a method 1000 for tracking modified objects. Beginning at reference numeral 1002, an application makes a call to update a data object. At 1004, a notification is triggered by the call to update the data object. At 1006, the change detection component checks if the data object has been previously copied. If the data object has not been copied before, the change detection component copies the data object and adds the copy of the data object to a list of modified data objects at 1008. If the data object has already been copied, a copy of the original data object has already been added to the list and should not be overwritten. At 1010, the data object is updated as specified by the application. Consider the following exemplary C# code:

```
public partial class Customer : IChangeNotifier {
    private string _CustomerID;
    public string CustomerID {
        get {
            return this._CustomerID;
        }
        set {
            if ((this._CustomerID != value)) {
                // The following notification causes a copy of the original
                values
                this.OnChanging();
                this._CustomerID = value;
            }
        }
    }
    private void OnChanging() {
        if ((this.ObjectChanging != null)) {
            this.ObjectChanging(this, System.EventArgs.Empty);
        }
    }
}
A notification interface may be used to specify an event handler for
the changing object:
    public interface IChangeNotifier {
        event ObjectChangingEventHandler ObjectChanging;
    }
```

Here, the set accessor for a property within the Customer class, described in detail above, includes a notification that tells the change detection component of the ORM system that the data object is about to change. The ORM system is notified just before the data object is actually changed to allow the ORM system to create a copy before the data object is modified.

Figure 11:
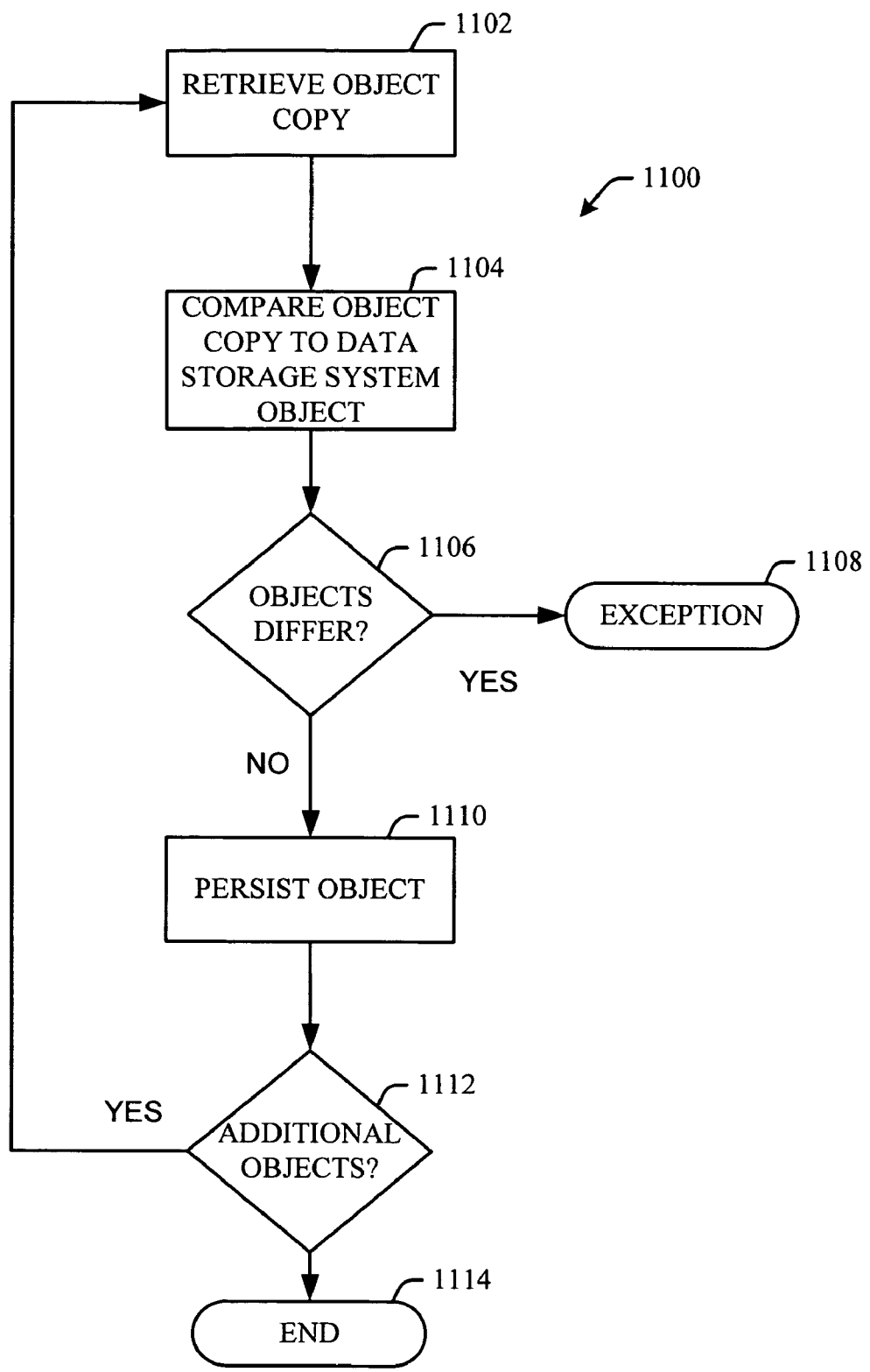
FIG. 11 is a flowchart illustrating a method for persisting modifications to relational data to a data storage system.

Turning now to FIG. 11, at some point the modifications to the data objects should be persisted back to the data storage system. FIG. 11 illustrates a method 1100 for persisting changes to the data storage system. Beginning at 1102, the first data object copy is retrieved from the list of modified data objects. The data object copies contain the original relational data pulled from the data storage system. At 1104, the data object copy is compared to the data object in the data storage system. At 1106, a check is made to determine whether the data object copy is different from the data storage system object. if yes, then the data object in the data storage system has been modified and an exception may be generated at 1108. If the data object copy and the data storage system object are identical, then the data storage system object was unchanged and at 1110 the modified data object may be persisted to the data storage system. At 1112 a check is made to determine whether there are additional data objects in the list of modified data objects. If yes, the next data object copy is retrieved at 1102. Otherwise, the method terminates at 1114.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flowcharts of FIGS. 2, 5-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 12:
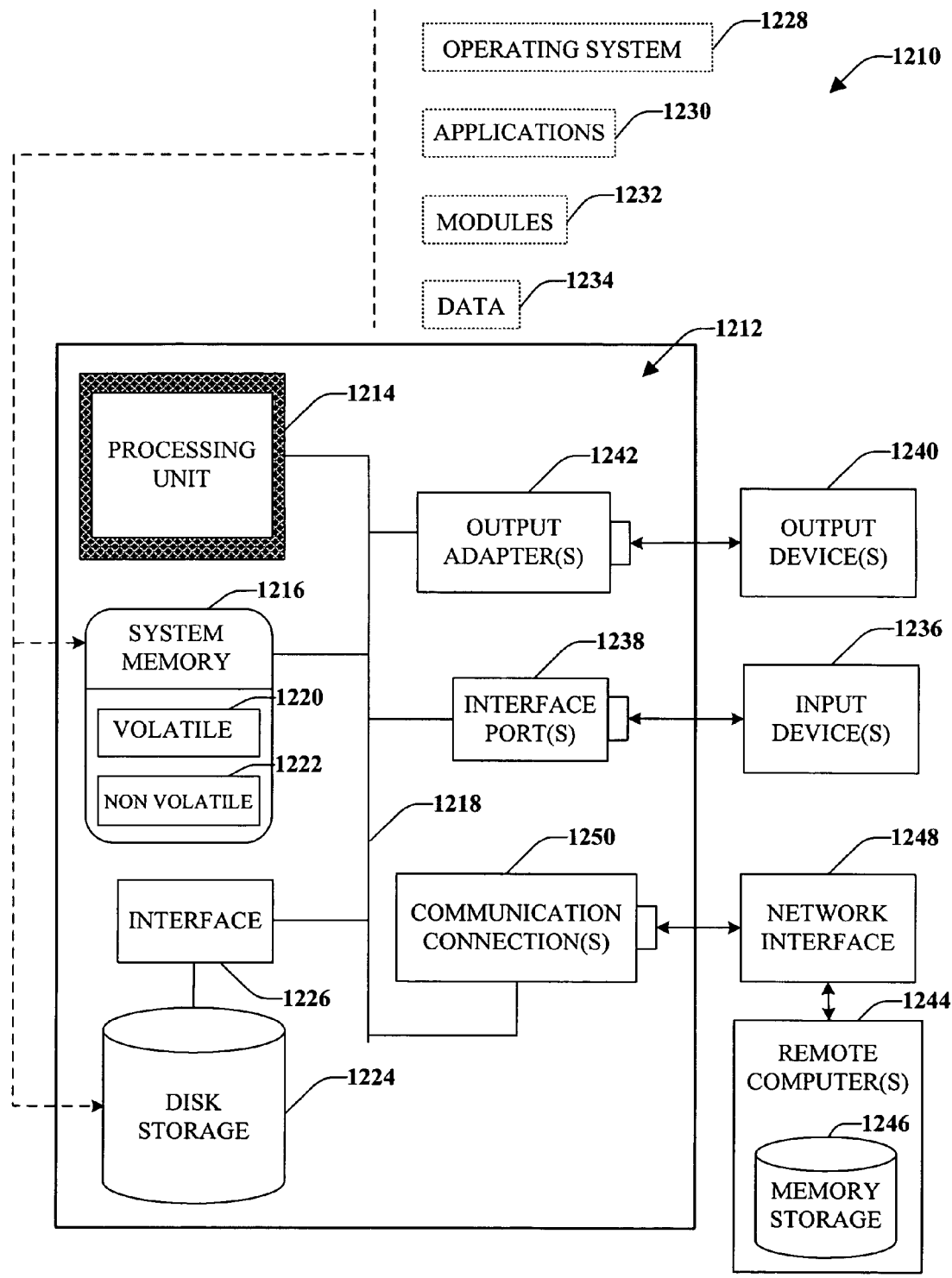
FIG. 12 is a schematic block diagram illustrating a suitable operating environment.
Figure 13:
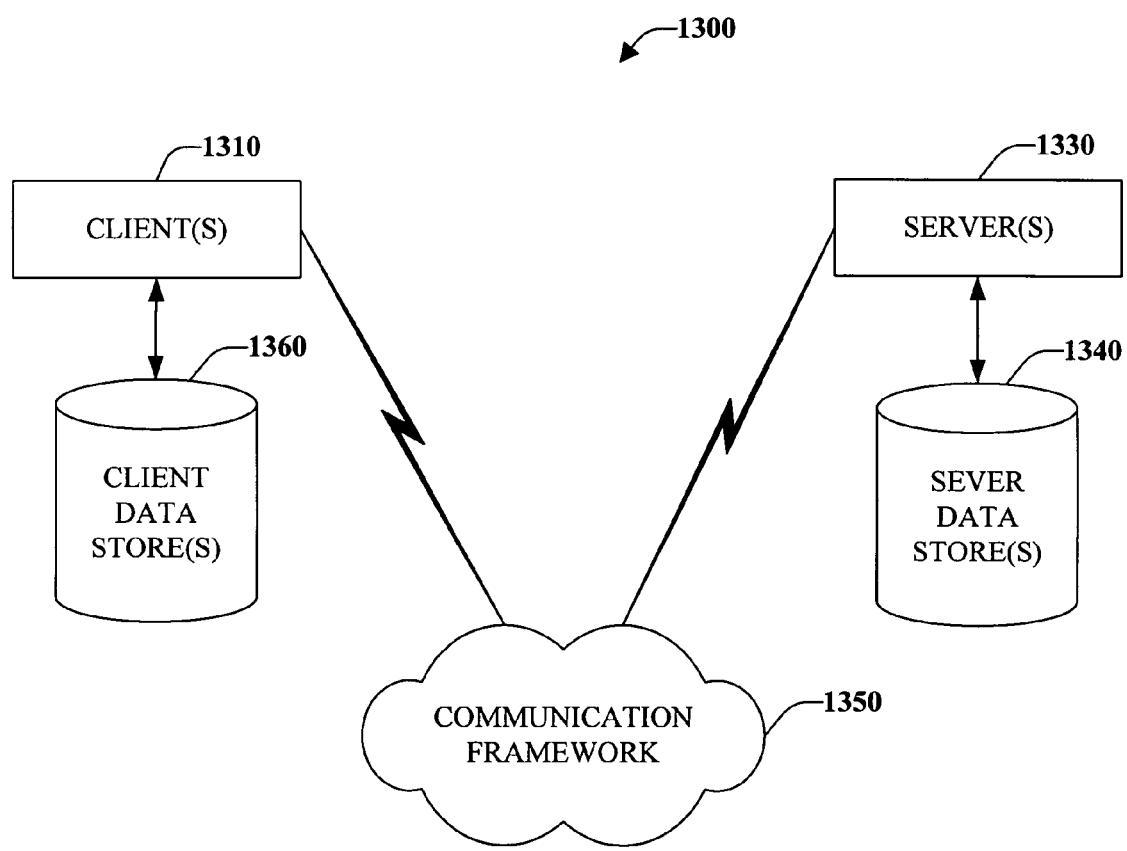
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection(s) 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the present invention can interact. The system 1300 includes one or more client(s) 1310. The client(s) 1310 can be hardware and/or software (e.g. threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for determining whether changes have been made to relational data in a data storage system while the relational data is copied into an object model and before the relational data in the object model is copied back to the data storage system, comprising:

copying relational data from the data storage system into a first data object for access by a first application program;

upon the first application program attempting to update the relational data in the first data object, creating a copy of the first data object;

storing the copy of the first data object in a list of modified data object components;

updating the relational data of the first data object; and upon attempting to copy the updated relational data of the first data object back to the data storage system, comparing the copy of the first data object to the relational data stored in the data storage system such that upon determining that the copy of the relational data of the first data object matches the relational data stored in the data storage system indicating that the relational data in the data storage system has not been modified by another application program or component, the updated relational data of the first data object is copied to the data storage system, and whereas upon determining that the copy of the relational data of the first data object does not match the relational data stored in the data storage system, the updated relational data of the first data object is not copied to the data storage system.

2. The method of claim 1 wherein the first data object includes relational data that references relational data of a second data object, the method further comprising:

upon updating the relational data of the first data object, notifying the second data object of the update.

3. The method of claim 1, comprising:

determining the relational data tables utilized by a data storage component; and instantiating data object tables using a generic class corresponding to the relational data tables utilized by the data storage component.

4. A computer readable storage medium having stored thereon computer executable instructions for carrying out the method of claim 1.

* * * * *

UNITED STATES PATENT AND TRADEMARK OFFICE
CERTIFICATE OF CORRECTION

| | | |
|---|---|---|
| PATENT NO. | : 7,631,011 B2 | Page 1 of 1 |
| APPLICATION NO. | : 11/193690 | |
| DATED | : December 8, 2009 | |
| INVENTOR(S) | : Dinesh Chandrakant Kulkarni et al. | |

It is certified that error appears in the above-identified patent and that said Letters Patent is hereby corrected as shown below:

In column 15, line 6, delete "if" and insert -- If --, therefor.

Signed and Sealed this
Eighth Day of February, 2011

David J. Kappos
*Director of the United States Patent and Trademark Office*